UNITED STATES PATENT OFFICE.

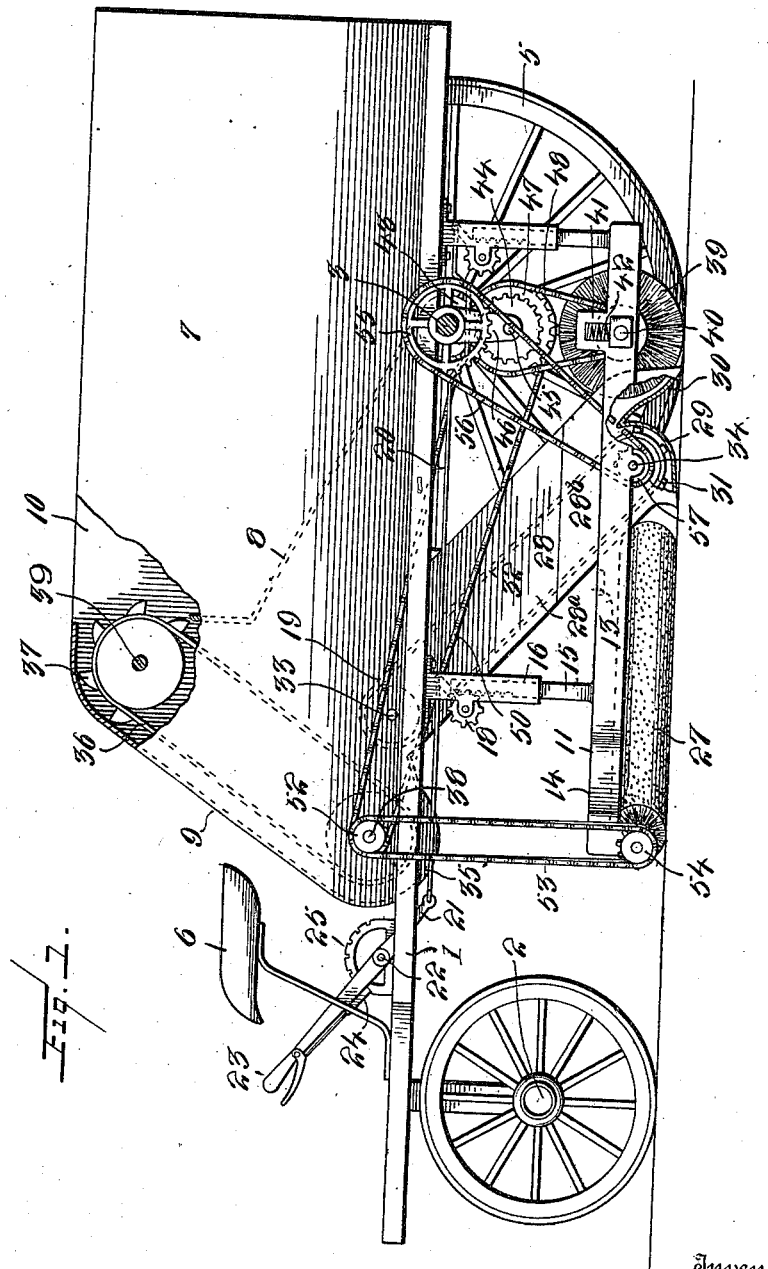

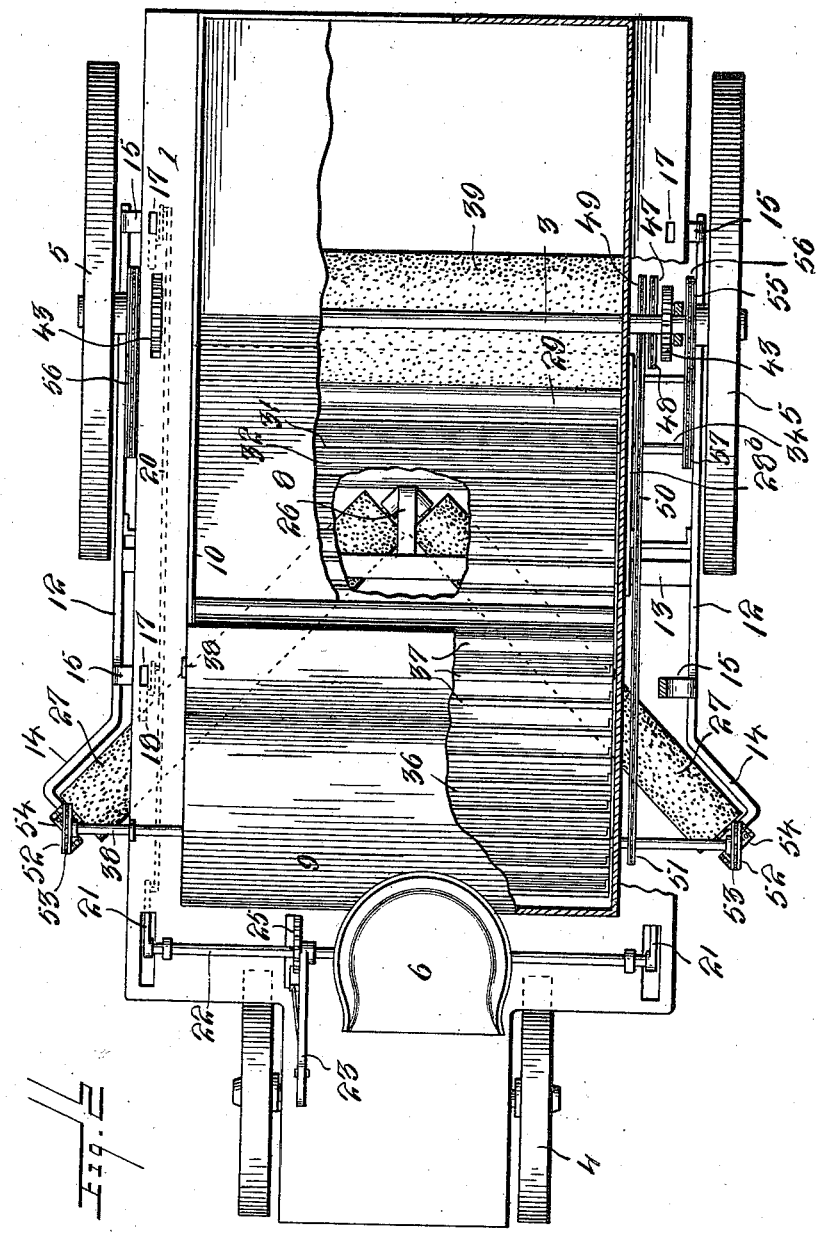

ALBERT S. MACHEN, OF NORFOLK, VIRGINIA.

STREET-SWEEPER.

989,377. Specification of Letters Patent. Patented Apr. 11, 1911.

Application filed February 1, 1910. Serial No. 541,320.

*To all whom it may concern:*

Be it known that I, ALBERT S. MACHEN, a citizen of the United States, residing at Norfolk, in the county of Norfolk and State of Virginia, have invented new and useful Improvements in Street-Sweepers, of which the following is a specification.

This invention relates to street sweepers, the object of the invention being to provide a sweeper which is simple of construction, susceptible of production at a comparatively low cost, and adapted to gather the coarse and fine particles of dirt in an equally efficient manner.

The invention consists of the features of construction, combination and arrangement of parts hereinafter fully described and claimed, reference being had to the accompanying drawings, in which:—

Figure 1 is a side elevation, with parts broken away and shown in section, of a street sweeper embodying my invention. Fig. 2 is a top plan view of the same, parts being broken away and shown in section.

Referring to the drawings, 1 designates the main frame of the machine, which is mounted upon front and rear axles 2 and 3, on which axles are respectively mounted supporting wheels 4 and 5. In practice, the front axle is pivotally connected with the frame for steering purposes, in the usual manner, and a suitable draft appliance is provided for the attachment of draft animals in drawing the machine, which, however, may be motor-propelled if desired.

Upon the front portion of the main frame is arranged a driver's seat 6, in rear of which is disposed a dirt receptacle 7, having a partition 8 separating it into compartments 9 and 10 in communication at the upper front portion of said receptacle.

The axle 3 constitutes a driving shaft for transmitting motion to the dirt gathering devices, which devices are mounted upon a carrier frame 11 disposed beneath the main frame 1, said carrier frame including in its construction a pair of longitudinal side bars 12 and a cross bar 13, said side bars having offset or L-shaped forward ends 14. The side bars of the frame 11 are provided with upwardly extending arms 15 movable vertically in guide sleeves 16 depending from the main frame, which sleeves have their upper ends open and registering with apertures 17 in the frame, to permit of a desired extent of vertical movement of the arms 15 for adjustment of the carrier frame. The said arms 15 are provided with rack teeth with which mesh pinions 18 journaled on the guide sleeves, the shafts of which pinions are provided with crank arms pivotally connected with rods 20 coupled to crank arms 21 on a rock shaft 22 journaled in suitable bearings upon the front portion of the main frame. Fixed to said shaft is a lever 23, whereby the shaft may be adjusted to turn the pinions 18 in one direction or the other, to vertically adjust the frame 11, said lever being provided with a pawl 24 to engage a fixed rack 25, whereby it may be secured in adjusted position.

The cross bar 13 of the brush carrier frame is provided with a central rear bearing extension 26, in which are journaled the rear ends of a pair of front rotary brushes 27, which incline outwardly and forwardly at an angle of 45° to the line of travel of the machine and are journaled at their forward ends in the offsets 14. The brushes 27 thus converge rearwardly, and in operation said brushes rotate in an upward and rearward direction to sweep the earth toward the center line of the machine. Arranged in rear of the brushes 27 is an upwardly and forwardly inclined casing 28 communicating at its upper end with the compartment 9 of the receptacle 7 and having at its lower end a front gathering tray or pan 29 and a rear gathering pan or tray 30. The front gathering pan 29 is adapted to receive the earth gathered by the brushes 27 and to dispose the same so as to be taken up by the buckets or flights 31 of an endless conveyer 32 extending through the casing 28, said conveyer being mounted upon upper and lower transverse shafts 33 and 34 journaled respectively upon the receptacle 7 and frame 11. The earth taken up by the conveyer 32 is deposited into a pocket 35 at the base of the compartment 9, from which it is taken up by an endless delivery conveyer 36 having buckets or flights 37 and mounted upon transverse shafts 38 and 39, said conveyer inclining upwardly and rearwardly so as to deliver the dirt from the top of the compartment 9 into the upper front portion of the compartment 10, whence it falls onto the inclined shelf or partition 8 and is properly banked thereby into the compartment 10. The finer particles of dirt which may happen to pass the brushes 27 are taken up by a rear transverse brush 39 which rotates in a rearward direction and sweeps the dirt up the surface of the inclined tray 30 so that it will be gathered by the conveyer 32 and carried upward into the compartment 9 of the receptacle. The brush 39 is mounted upon a shaft 40 movable vertically in bearing slots 41 and backed by yielding pressure springs 42, by which the brush is adapted to have sufficient vertical movement to accommodate itself to irregularities in the street surface whereby the latter may be cleansed in an effective manner.

On the driving shaft or axle 3 are spur gears 43 which communicate motion to gears 44 on an underlying countershaft 45 journaled in brackets 46 depending from the main frame. On each end of said shaft 45 is a sprocket wheel 47 which drives a chain 48, the two chains 48 connecting said sprocket wheels 47 with the sprocket wheels on the shaft 40 by which the brush 39 is driven. On said shaft 45 is also a sprocket wheel 49 driving a chain 50 which passes around a sprocket wheel 51 on the shaft 38 and thus drives the delivery conveyer 36. On each end of the shaft 38 is a sprocket wheel 52 connected by a chain 53 with a sprocket wheel 54 on the outer end of the adjacent brush 27, whereby the two front brushes 27 are driven. On each end of the axle 3 is a sprocket wheel 55 connected by a chain 56 with a sprocket gear 57 on the adjacent end of the shaft 34, by which the endless transmitting conveyer 32 is driven.

From the foregoing description, taken in connection with the drawings, it will be seen that in the forward movement of the machine the brushes 27 will be rotated rearwardly to sweep the earth forwardly and toward the center of the machine, the earth thus gathered being elevated by the conveyer 32 into the compartment 9 of the receptacle, and thence delivered by the conveyer 36 into the compartment 10 of the receptacle. It will be further seen that the earth which escapes the front brushes will be swept up by the rear transverse brush 39 and delivered into the receptacle by the conveyers in the manner described. By means of the adjusting mechanism the frame 11 may be raised or lowered to adapt the brushes to bear with greater or less force on the street surface, and by elevating said frame to a sufficient extent to slack the sprocket chains, the drive gearing may be thrown out of operation.

It will thus be apparent that the invention provides a simple and comparatively inexpensive construction of sweeper which will be thoroughly efficient in action.

The casing 28 is composed of an upper section 28$^a$ fixed to the main frame and a lower section 28$^b$ carrying the trays 29 and 30, which lower section embodies side plates slidably engaging the section 28 so that it may be raised and lowered with the frame 11.

Having thus described the invention, I claim:—

1. A street sweeper embodying a main frame carrying a receptacle, a carrier frame arranged below and vertically adjustable on said main frame, a pair of rearwardly converging front brushes mounted on the carrier frame, a transverse brush disposed in rear of said front brushes and also mounted on the carrier frame, a casing having gathering trays extending forwardly and rearwardly between the front and transverse brushes to take up the dirt gathered thereby said casing comprising relatively adjustable sections mounted respectively on the main and carrier frames, gearing for driving the brushes, and a conveyer movable through said casing for elevating the dirt gathered by both trays into said receptacle.

2. A street sweeper embodying a main frame carrying a dirt receptacle, a carrier frame vertically adjustable on said main frame, front converging brushes mounted on the carrier frame, a rear transverse brush mounted on said carrier frame, a casing composed of an upper section fixed to the main frame and a lower section mounted on the carrier frame and including side plates slidably engaging said upper section, gathering devices carried by the lower section of the casing for coöperation with the brushes, a conveyer extending upwardly through said casing into the receptacle, and gearing for driving said brushes and conveyer.

3. A street sweeper embodying a main frame carrying a receptacle, a rectangular carrier frame arranged below the main frame, sleeves depending from the main frame, gear pinions mounted upon the sleeves, rack bars on the carrier frame slidably engaging the sleeves and meshing with the gear pinions, front converging brushes mounted on the carrier frame, a rear transverse brush mounted on said carrier frame, a casing composed of parts having a sliding engagement and respectively carried by the main and carrier frames, said casing being provided with gathering trays for coöperation with said brushes, a conveyer movable through said casing for elevating the dirt gathered by the trays into said receptacle, and gearing for driving the brushes and conveyer.

In testimony whereof I affix my signature in presence of two witnesses.

ALBERT S. MACHEN.

Witnesses:
WAITE HANK,
M. R. SHAW.

Copies of this patent may be obtained for five cents each, by addressing the "Commissioner of Patents, Washington, D. C."